United States Patent
Hiratsuka

(10) Patent No.: US 10,038,806 B2
(45) Date of Patent: Jul. 31, 2018

(54) IMAGE FORMING APPARATUS, NON-TRANSITORY COMPUTER READABLE RECORDING MEDIUM, AND INFORMATION PROCESSING METHOD

(71) Applicant: KYOCERA DOCUMENT SOLUTIONS INC., Osaka (JP)

(72) Inventor: Motoki Hiratsuka, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 15/621,205

(22) Filed: Jun. 13, 2017

(65) Prior Publication Data

US 2017/0374218 A1    Dec. 28, 2017

(30) Foreign Application Priority Data

Jun. 27, 2016    (JP) .................... 2016-126389

(51) Int. Cl.
*H04N 1/00*    (2006.01)
*H04N 1/32*    (2006.01)
*G06F 13/26*    (2006.01)

(52) U.S. Cl.
CPC ......... *H04N 1/00917* (2013.01); *G06F 13/26* (2013.01); *H04N 1/32496* (2013.01); *H04N 1/32561* (2013.01)

(58) Field of Classification Search
CPC ........... H04N 1/00917; H04N 1/32496; H04N 1/32561; G03G 15/5012; G06F 13/26; G06F 13/30; G06F 13/32; G06F 13/34
See application file for complete search history.

(56) References Cited

U.S. PATENT DOCUMENTS

| 5,535,009 A | * | 7/1996 | Hansen | G03G 15/5012 358/296 |
| 2003/0035142 A1 | * | 2/2003 | Kizaki | H04N 1/00915 358/1.16 |
| 2004/0263904 A1 | * | 12/2004 | Sobko | G06F 3/1211 358/1.15 |

(Continued)

FOREIGN PATENT DOCUMENTS

| JP | 2007-003025 A | 1/2007 |
| JP | 2014-153981 A | 8/2014 |

*Primary Examiner* — Moustapha Diaby
(74) *Attorney, Agent, or Firm* — Li & Cai Intellectual Property (USA) Office

(57) ABSTRACT

An image forming apparatus obtains an interrupt execution instruction of an image forming job, the interrupt execution instruction including image data and execution information, suspends a prior image forming job being executed by using a first memory area, generates printable data by applying the execution information to image data of the suspended prior image forming job, writes the generated printable data in a second memory area, deletes the prior image forming job from the first memory area to free the first memory area, executes an interrupt image forming job of the interrupt execution instruction by using the first memory area, the prior image forming job having been deleted from the first memory area, and retrieves the printable data written in the second memory area and forms an image by using the retrieved printable data to execute the suspended prior image forming job.

8 Claims, 7 Drawing Sheets

(56) References Cited

U.S. PATENT DOCUMENTS

| | | | |
|---|---|---|---|
| 2006/0268310 A1* | 11/2006 | Tamai | H04N 1/00915 358/1.14 |
| 2007/0147870 A1* | 6/2007 | Shindo | G03G 15/5012 399/82 |
| 2007/0268508 A1* | 11/2007 | Kitamura | G06K 15/00 358/1.14 |
| 2007/0285717 A1* | 12/2007 | Muto | G03G 15/5012 358/1.16 |
| 2011/0188074 A1* | 8/2011 | Nakano | G06F 3/12 358/1.15 |

* cited by examiner

IMAGE FORMING APPARATUS, NON-TRANSITORY COMPUTER READABLE RECORDING MEDIUM, AND INFORMATION PROCESSING METHOD

CROSS REFERENCE TO RELATED APPLICATION

This application claims the benefit of Japanese Priority Patent Application JP2016-126389 filed Jun. 27, 2016, the entire contents of which are incorporated herein by reference.

BACKGROUND OF THE INVENTION

1. Field of the Invention

The present disclosure relates to an image forming apparatus capable of obtaining an interrupt execution instruction of an image forming job and executing an interrupt image forming job of the interrupt execution instruction before a prior image forming job (in interrupt processing), a non-transitory computer readable recording medium that stores a program, and an information processing method.

2. Description of Related Art

There is known an image forming apparatus capable of executing an interrupt image forming job of an interrupt execution instruction before a prior image forming job (in interrupt processing).

SUMMARY OF THE INVENTION

It is desirable for an image forming apparatus to, when the image forming apparatus obtains an interrupt execution instruction of an image forming job, reliably execute the interrupt image forming job in interrupt processing. A reason is as follows. A user, who inputs the interrupt execution instruction in the image forming apparatus, wishes to execute the interrupt image forming job even if the prior image forming job is to be suspended and executed later.

In view of the above-mentioned circumstances, it is desirable to provide an image forming apparatus highly reliable in, when obtaining an interrupt execution instruction of an image forming job, executing the interrupt image forming job before a prior image forming job (in interrupt processing), a non-transitory computer readable recording medium that stores a program, and an information processing method.

According to an embodiment of the present disclosure, an image forming apparatus includes:
  a first memory area used for image processing;
  a second memory area different from the first memory area; and
  a job execution circuit that
    obtains an interrupt execution instruction of an image forming job, the interrupt execution instruction including image data and execution information, the execution information being to be applied when forming an image of the image data,
    suspends a prior image forming job being executed by using the first memory area, and
    as a first interrupt processing,
    generates printable data by applying the execution information to image data of the suspended prior image forming job,
    writes the generated printable data in the second memory area,
    deletes the prior image forming job from the first memory area to free the first memory area,
    executes an interrupt image forming job of the interrupt execution instruction by using the first memory area, the prior image forming job having been deleted from the first memory area, and
    retrieves the printable data written in the second memory area and forms an image by using the retrieved printable data to execute the suspended prior image forming job.

According to an embodiment of the present disclosure, a non-transitory computer readable recording medium stores a program executable by a computer of an image forming apparatus, the image forming apparatus including a first memory area used for image processing, and a second memory area different from the first memory area, the program causing the computer to:
  obtain an interrupt execution instruction of an image forming job, the interrupt execution instruction including image data and execution information, the execution information being to be applied when forming an image of the image data;
  suspend a prior image forming job being executed by using the first memory area; and
  as a first interrupt processing,
  generate printable data by applying the execution information to image data of the suspended prior image forming job,
  write the generated printable data in the second memory area,
  delete the prior image forming job from the first memory area to free the first memory area,
  execute an interrupt image forming job of the interrupt execution instruction by using the first memory area, the prior image forming job having been deleted from the first memory area, and
  retrieve the printable data written in the second memory area and form an image by using the retrieved printable data to execute the suspended prior image forming job.

According to an embodiment of the present disclosure, an information processing method includes:
  by an image forming apparatus, the image forming apparatus including a first memory area used for image processing, and a second memory area different from the first memory area,
  obtaining an interrupt execution instruction of an image forming job, the interrupt execution instruction including image data and execution information, the execution information being to be applied when forming an image of the image data;
  suspending a prior image forming job being executed by using the first memory area; and
  as a first interrupt processing,
  generating printable data by applying the execution information to image data of the suspended prior image forming job,
  writing the generated printable data in the second memory area,
  deleting the prior image forming job from the first memory area to free the first memory area,
  executing an interrupt image forming job of the interrupt execution instruction by using the first memory area, the prior image forming job having been deleted from the first memory area, and retrieving the printable data written in the second memory area and forming an image by using the retrieved printable data to execute the suspended prior image forming job.

These and other objects, features and advantages of the present disclosure will become more apparent in light of the following detailed description of best mode embodiments thereof, as illustrated in the accompanying drawings.

DETAILED DESCRIPTION OF THE PREFERRED EMBODIMENTS

Hereinafter, an embodiment of the present disclosure will be described with reference to the drawings.

(1. Hardware Configuration of Image Forming Apparatus)

Figure 1:
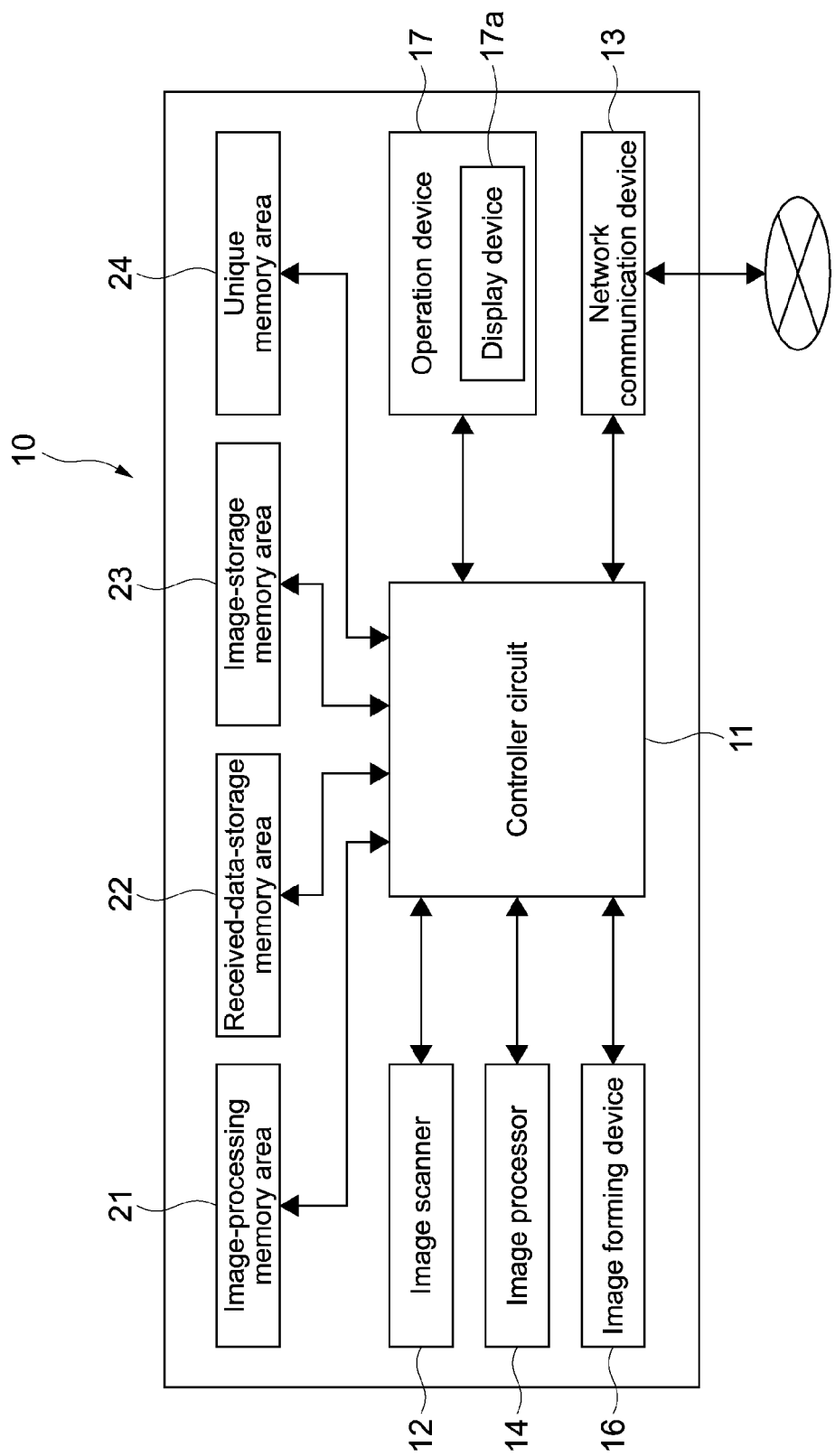
FIG. 1 shows a hardware configuration of an image forming apparatus.

FIG. 1 shows a hardware configuration of an image forming apparatus of an embodiment of the present disclosure.

An information processing apparatus of the embodiment of the present disclosure is an image forming apparatus (for example, MFP, Multifunction Peripheral), and is referred to as an MFP hereinafter.

The MFP 10 includes the controller circuit 11. The controller circuit 11 includes a CPU (Central Processing Unit) (processor), a RAM (Random Access Memory), a ROM (Read Only Memory), dedicated hardware circuits, and other components. The controller circuit 11 controls the overall operations of the MFP 10. A non-transitory computer readable recording medium such as a ROM stores a computer program causing the MFP 10 to operate as the functional units (described later).

The controller circuit 11 is connected to the image scanner 12, the image processor 14, the image forming device 16, the operation device 17, the network communication device 13, and the like. The controller circuit 11 controls the operations of the above-mentioned units connected thereto, and sends/receives signals or data to/from those units.

In response to job execution instructions input by a user via the operation device 17, a personal computer (not shown) connected via a network, or the like, the controller circuit 11 controls driving and processing of the mechanisms necessary to control operations of respective functions such as a scanner function, a print function, and a copy function.

The image scanner 12 captures an image of a script.

The image processor 14 as necessary processes an image of image data of the image captured by the image scanner 12.

The image forming device 16 forms an image of image data captured by the image scanner 12, for example.

The operation device 17 includes a touch panel unit and an operation key unit that receive, from a user, instructions of various operations and processing that the MFP 10 can execute. The touch panel unit includes the display device 17a such as an LCD (Liquid Crystal Display) with a touch panel.

The network communication device 13 is an interface for connecting to a network.

The MFP 10 further includes, as memory areas independent of each other, the image-processing memory area 21 (first memory area), the received-data-storage memory area 22 (second memory area), the image-storage memory area 23 (third memory area), and the unique memory area 24 (fourth memory area). The memory areas 21 to 24 may be physically-independent memories (RAMs). Alternatively, the independent areas may be provided by dividing a single memory.

The image-processing memory area 21 (first memory area) is a memory area used for image processing executed by the image processor 14, and includes areas allocated for respective jobs by the controller circuit 11. The controller circuit 11 frees areas for completed image processing jobs. The received-data-storage memory area 22 (second memory area) is a memory area, in which data received by the MFP 10 is temporarily stored. The image-storage memory area 23 (third memory area) is a memory area, in which image data is stored, and is a memory (RAM) or a RAM disk. The unique memory area 24 (fourth memory area) is a memory area, in which execution information is stored, the execution information being to be applied when forming an image of image data.

(2. Functional Configuration of Image Forming Apparatus)

Figure 2:
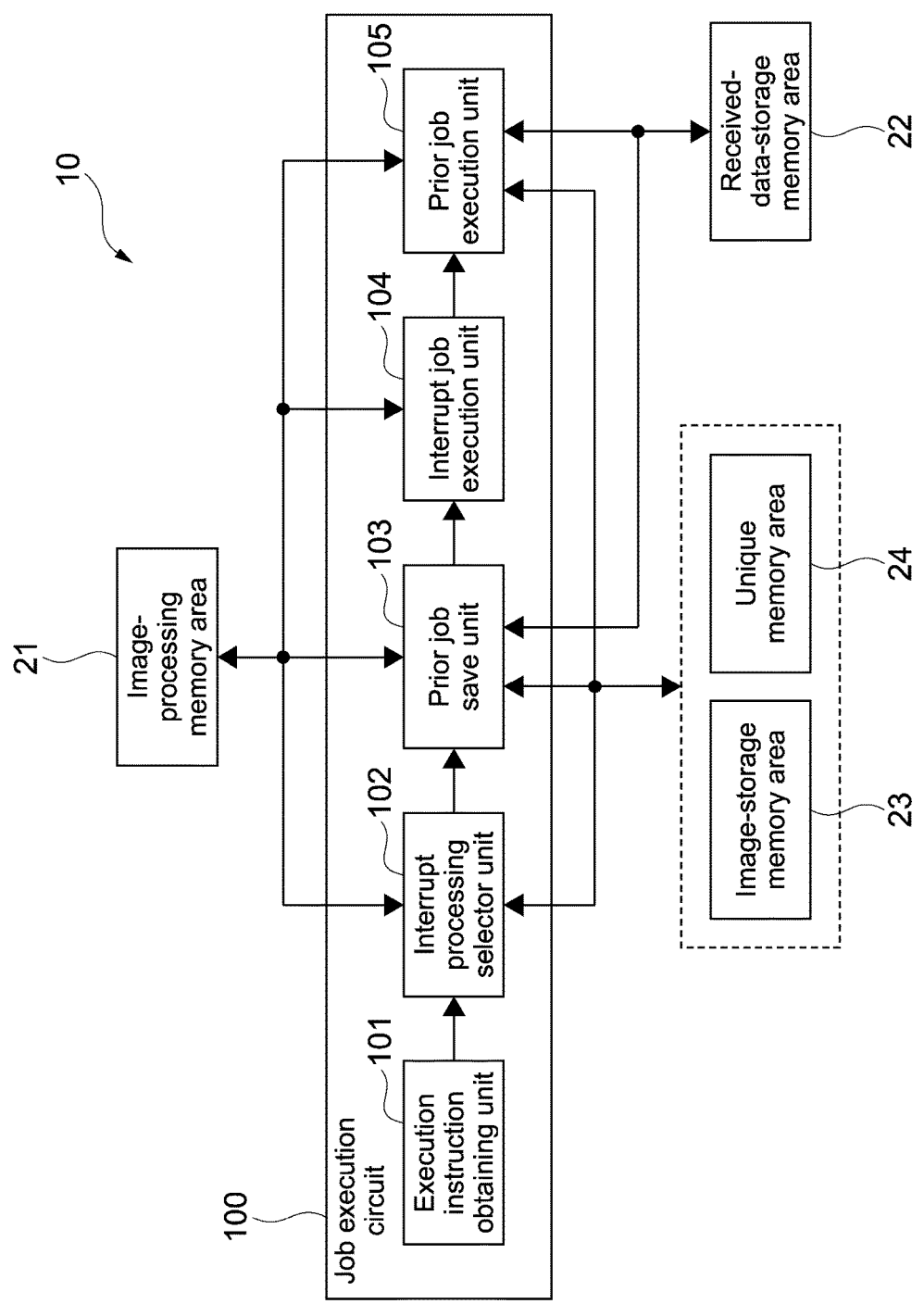
FIG. 2 shows a functional configuration of the image forming apparatus.

FIG. 2 shows a functional configuration of the image forming apparatus.

The CPU (processor) of the controller circuit 11 loads an information processing program stored in the ROM (memory), which is an example of a non-transitory computer readable recording medium, in the RAM and executes the information processing program to thereby operate as the job execution circuit 100. The job execution circuit 100 functionally includes the execution instruction obtaining unit 101, the interrupt processing selector unit 102, the prior job save unit 103, the interrupt job execution unit 104, and the prior job execution unit 105.

In the present disclosure, "interrupt" or "interrupt processing" means to execute image formation before executing an image forming job of a previously-obtained execution instruction.

The execution instruction obtaining unit 101 obtains an interrupt execution instruction of an image forming job from an information processing apparatus such as a personal computer via a network, for example.

The interrupt processing selector unit 102 selects one type of interrupt processing to be executed out of a normal interrupt processing, a first interrupt processing, and a second interrupt processing, in order to execute an image forming job (interrupt image forming job) of the obtained interrupt execution instruction in interrupt processing.

The prior job save unit 103 saves an image forming job (prior image forming job) of an execution instruction obtained before the interrupt execution instruction.

The interrupt job execution unit 104 executes the interrupt image forming job after the prior image forming job is saved.

The prior job execution unit 105 executes the prior image forming job after the interrupt image forming job is executed.

The processing of the prior job save unit 103, the interrupt job execution unit 104, and the prior job execution unit 105 varies depending on the normal interrupt processing, the first interrupt processing, or the second interrupt processing. The first interrupt processing and the second interrupt processing will be described later respectively.

(3. Processing of Image Forming Apparatus)

(3-1. Processing of Selecting Interrupt Processing)

Figure 3:
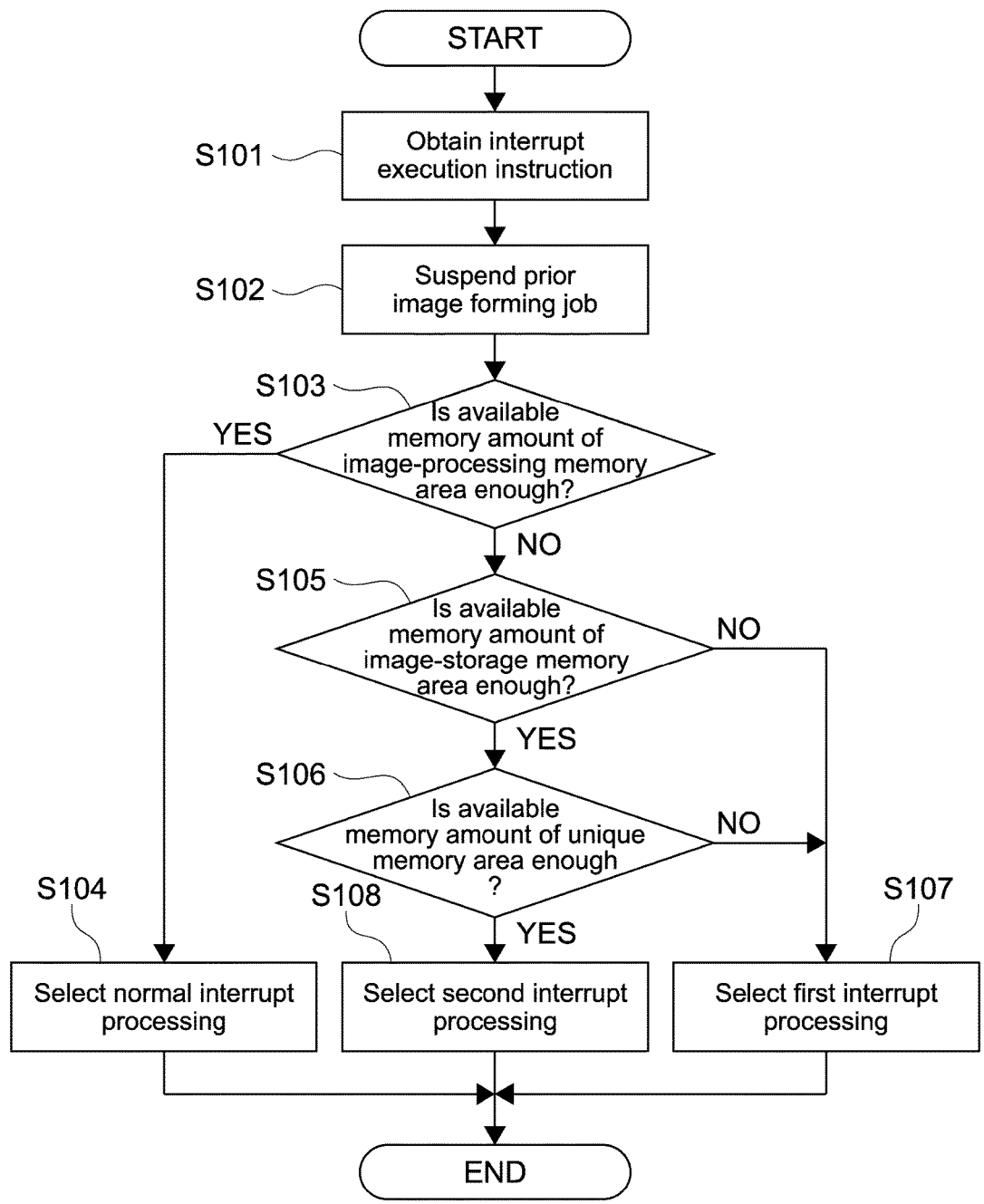
FIG. 3 shows a processing flow of the image forming apparatus for selecting which interrupt processing to execute.

FIG. 3 shows a processing flow of the image forming apparatus for selecting which interrupt processing to execute.

The execution instruction obtaining unit 101 obtains an interrupt execution instruction of an image forming job from an information processing apparatus such as a personal computer via a network, for example (Step S101). The interrupt execution instruction of an image forming job is data including image data and execution information. The "execution information" includes attributes (for example, number of pages, color, size, etc.) to be applied when forming an image based on the image data. When the execution instruction obtaining unit 101 obtains the interrupt execution instruction, the execution instruction obtaining unit 101 suspends all the one or more prior image forming jobs being executed by using the image-processing memory area 21 (Step S102). The execution instruction obtaining unit 101 supplies the interrupt image forming job of the obtained interrupt execution instruction to the interrupt processing selector unit 102.

The interrupt processing selector unit 102 determines if an available memory amount of the image-processing memory area 21 is a memory amount with which the interrupt image forming job, which is obtained from the execution instruction obtaining unit 101, can be executed or not (Step S103). Where determining that the available memory amount of the image-processing memory area 21 is a memory amount with which the interrupt image forming job can be executed (Step S103, YES), the interrupt processing selector unit 102 selects the normal interrupt processing (Step S104). The normal interrupt processing includes, for example, suspending a prior image forming job being executed by using the image-processing memory area 21, executing an interrupt image forming job by using the image-processing memory area 21, and resuming the prior image forming job (detailed description is omitted).

Meanwhile, where determining that the available memory amount of the image-processing memory area 21 is a memory amount with which the interrupt image forming job cannot be executed (Step S103, NO), the interrupt processing selector unit 102 retrieves, out of the one or more suspended prior image forming jobs, image data (if image is being formed, image data of part whose image is yet to be formed) of the prior image forming job (prior image forming job in front) written in the image-processing memory area 21 in front, and the execution information (if image is being formed, execution information of part whose image is yet to be formed).

The interrupt processing selector unit 102 determines if an available memory amount of the image-storage memory area 23 is a memory amount, with which the image data of the prior image forming job in front retrieved from the image-processing memory area 21 can be written, or not (Step S105). Further, the interrupt processing selector unit 102 determines if an available memory amount of the unique memory area 24 is a memory amount, with which the execution information of the prior image forming job in front retrieved from the image-processing memory area 21 can be written, or not (Step S106). Where determining that the image data cannot be written in the image-storage memory area 23 and/or the execution information cannot be written in the unique memory area 24 (NO in Step S105 or Step S106), the interrupt processing selector unit 102 selects the first interrupt processing (Step S107). Meanwhile, where determining that the image data can be written in the image-storage memory area 23 and the execution information can be written in the unique memory area 24 (YES in Step S105 and Step S106), the interrupt processing selector unit 102 selects the second interrupt processing (Step S108). The interrupt processing selector unit 102 notifies the prior job save unit 103 of the result of the selection. Note that "NO" in Step S105 or Step S106 means that there is an interrupt image forming job prior to the present interrupt image forming job, the image data and the execution information of the prior image forming job are already stored in the image-storage memory area 23 and the unique memory area 24 respectively, and the available memory amount of the image-storage memory area 23 or the unique memory area 24 is not enough to store the image data or the execution information of the other prior image forming job.

(3-2. First Interrupt Processing)

Figure 4:
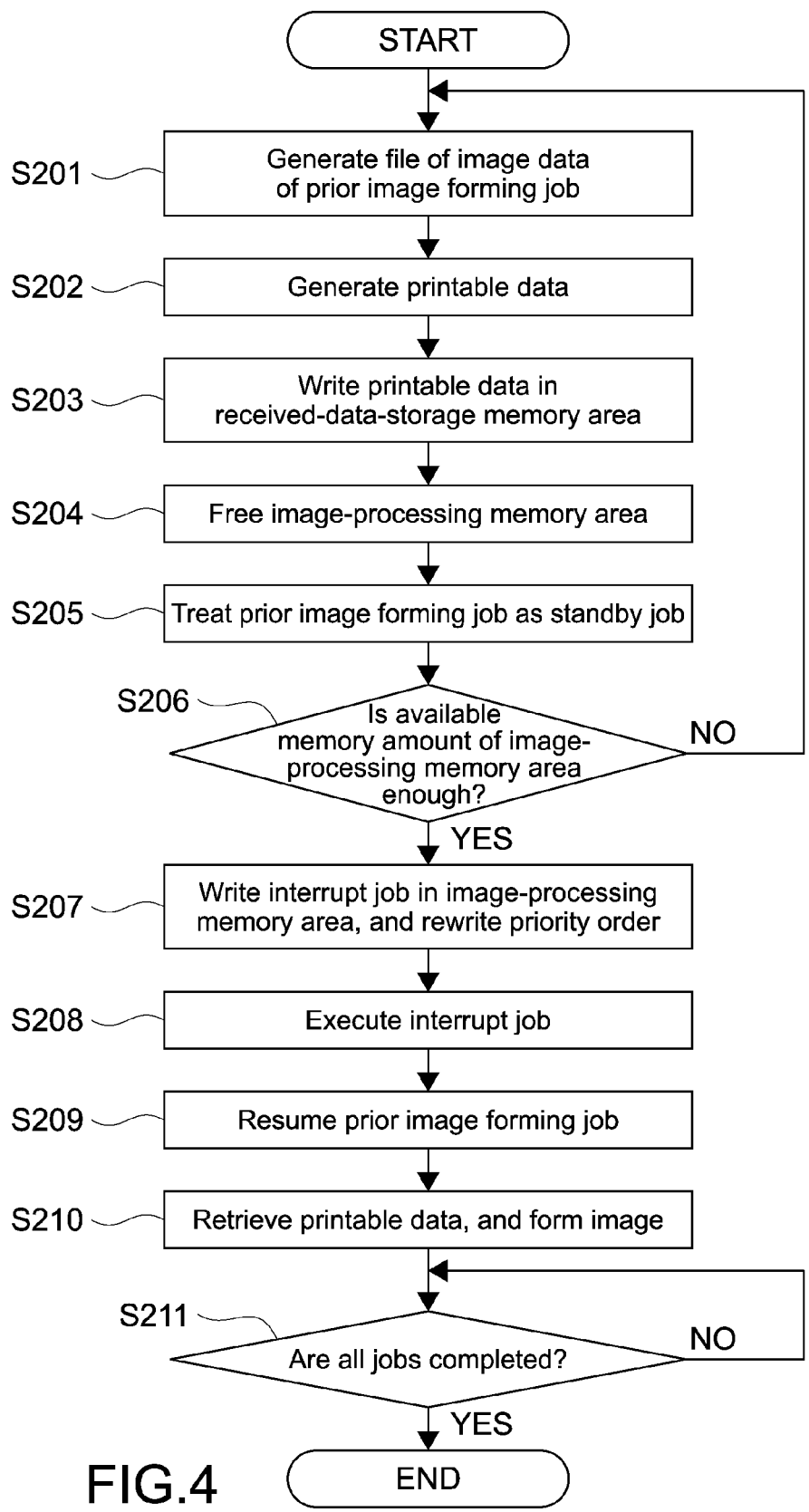
FIG. 4 shows the first interrupt processing flow that the image forming apparatus executes.
Figure 5:
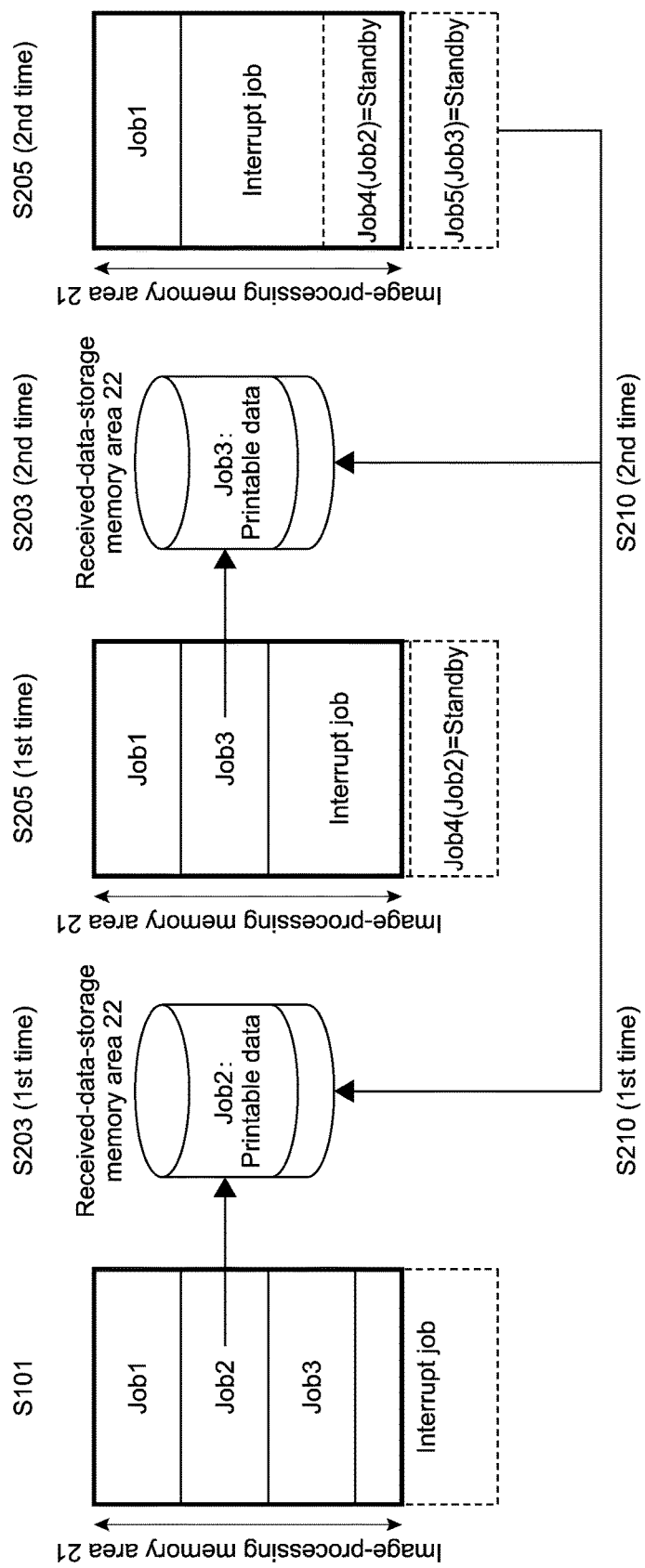
FIG. 5 schematically shows the first interrupt processing.

FIG. 4 shows the first interrupt processing flow that the image forming apparatus executes. FIG. 5 schematically shows the first interrupt processing.

On the presumption, the MFP 10 has obtained execution instructions of three prior image forming jobs (the job 1, the job 2, and the job 3), has written the job 1, the job 2, and the job 3 in the image-processing memory area 21 in this order from the front, and has executed forming part of an image of the job 1 in front. The job 2 and the job 3 are in the output queue. After that, the MFP 10 has obtained the interrupt execution instruction of the image forming job (interrupt job) (Step S101), and has suspended all the prior image forming jobs (the job 1, the job 2, and the job 3) being executed by using the image-processing memory area 21 (Step S102).

The prior job save unit 103 defines the prior image forming job in front (in this example, the job 2), whose image forming processing is yet to be started (yet to be output), out of the prior image forming jobs written in the image-processing memory area 21. Note that the prior job save unit 103 defines the job 1 if the image forming processing of the job 1 is yet to be started. The prior job save unit 103 retrieves the defined prior image forming job in front (the job 2) from the image-processing memory area 21, and generates a file of the image data of the job 2 (Step S201). The prior job save unit 103 generates printable data by applying the execution information of the job 2, which is retrieved from the image-processing memory area 21, to the file-of-image data (Step S202). The "printable data" has an image-formable (printable) file format (for example, JPEG), contains the execution information (number of pages, color, size, etc.) applied, and contains information such as the job type (print). The prior job save unit 103 writes the generated printable data of the job 2 in the received-data-storage memory area 22 (Step S203). The prior job save unit 103 deletes the job 2 from the image-processing memory area 21 to free part of the image-processing memory area 21 (area in which the job 2 is written), and completes the job 2 (the job result is not remained in the image-processing memory area 21) (Step S204).

The prior job save unit 103 treats the printable data of the job 2 as another job (the job 4), writes the job type (print)

of the job 2 as the job type of the job 4, and treats the job 4 as a standby job, which is to be executed next to the interrupt job (Step S205). The prior job save unit 103 determines if an available memory amount of the image-processing memory area 21, from which the job 2 has been deleted, is a memory amount with which the interrupt job can be executed (Step S206). Where determining that the interrupt job cannot be executed (Step S206, NO), the prior job save unit 103 executes the processing of Steps S201 to S205 of the prior image forming job (the job 3, which is treated as the job 5) next to the job 2 (see FIG. 5). Where determining that the interrupt job can be executed (Step S206, YES), the prior job save unit 103 notifies the interrupt job execution unit 104 of that.

When the interrupt job execution unit 104 receives the notification from the prior job save unit 103, the interrupt job execution unit 104 writes the interrupt job in the image-processing memory area 21, part of which is freed (areas in which the job 2 and the job 3 were written). The interrupt job execution unit 104 rewrites the priority order of the interrupt job and the job (the job 1) written in the image-processing memory area 21 (Step S207), and puts the highest priority on the interrupt job. The interrupt job execution unit 104 executes the interrupt job, which has the highest priority order (Step S208). Specifically, the interrupt job execution unit 104 generates printable data by applying the execution information to the image data of the interrupt job, and outputs the generated printable data. When the executed interrupt job is completed, the interrupt job execution unit 104 notifies the prior job execution unit 105 of that.

When the prior job execution unit 105 receives the notification from the interrupt job execution unit 104, the prior job execution unit 105 resumes the suspended prior image forming job (Step S102) being executed by using the image-processing memory area 21. In other words, firstly, the prior job execution unit 105 resumes the job 1 in front written in the image-processing memory area 21, part of the image having been formed (Step S209). Next, in order to execute the standby job 4 (same as the job 2) written in the image-processing memory area 21, the prior job execution unit 105 retrieves the printable data of the job 2 from the received-data-storage memory area 22, and forms (prints) the image of the retrieved printable data (Step S210). The prior job execution unit 105 determines if another standby job is written in the image-processing memory area 21 or not (Step S211). Where determining that the standby job 5 (same as the job 3) is written in the image-processing memory area 21 (Step S211, YES), the prior job execution unit 105 retrieves the printable data of the job 3 from the received-data-storage memory area 22, and forms (prints) the image of the retrieved printable data (Step S210). At last, the prior job execution unit 105 executes all the standby jobs written in the image-processing memory area 21 (Step S211, NO).

(3-3. Second Interrupt Processing)

Figure 6:
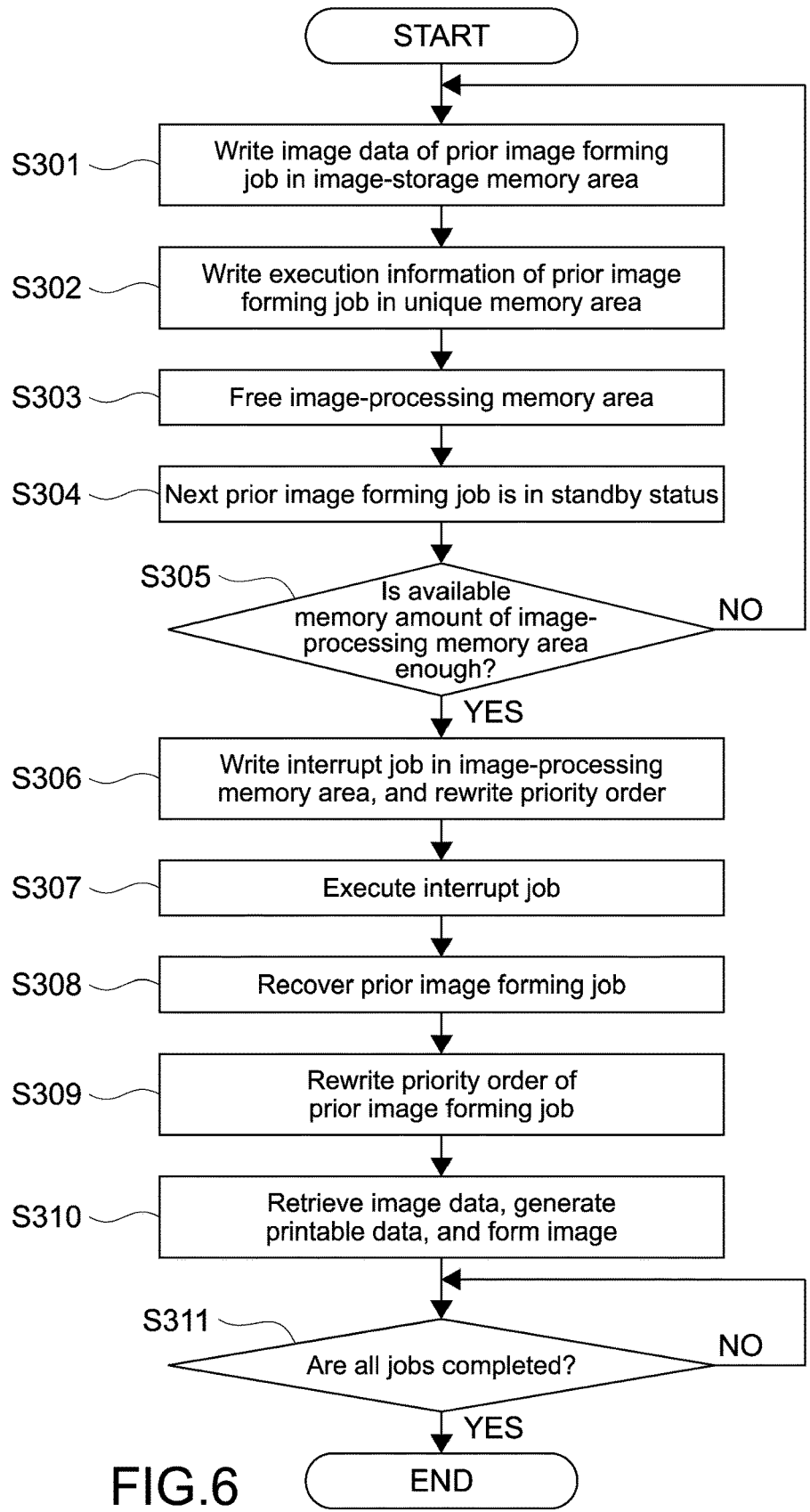
FIG. 6 shows the second interrupt processing flow that the image forming apparatus executes.
Figure 7:
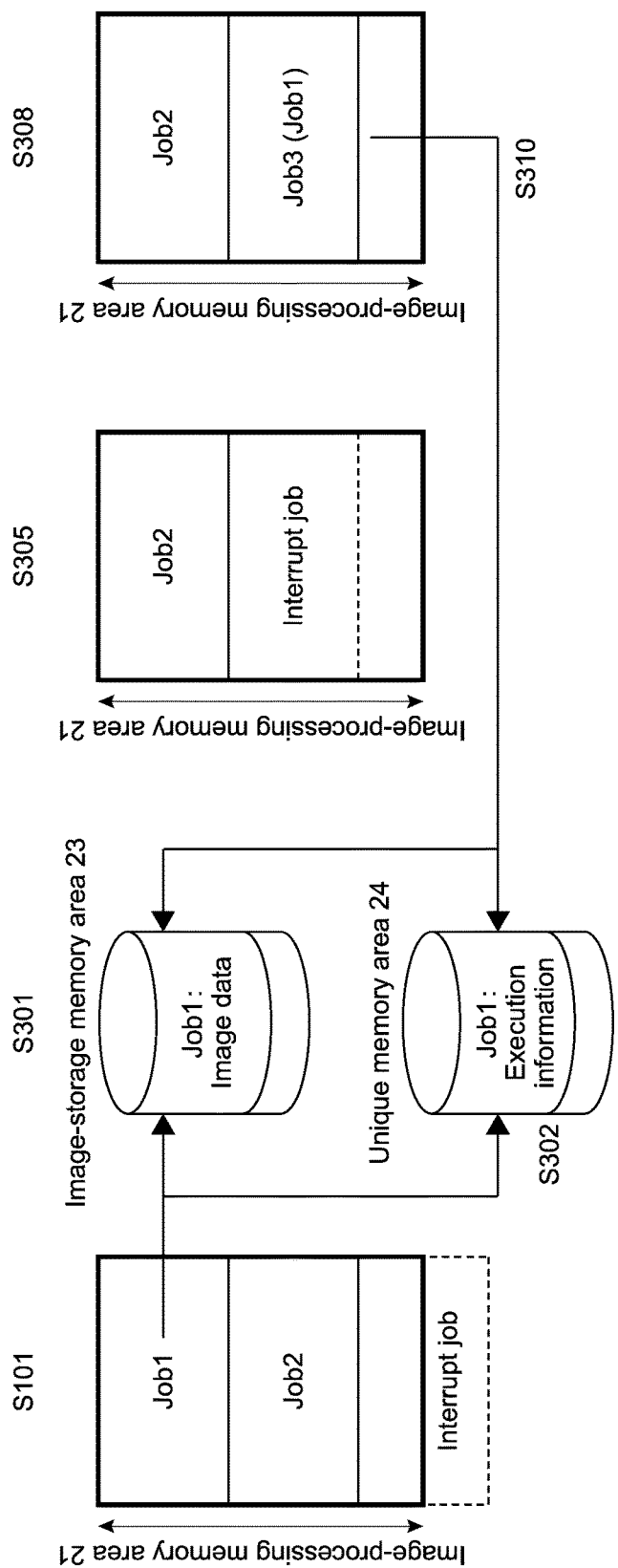
FIG. 7 schematically shows the second interrupt processing.

FIG. 6 shows the second interrupt processing flow that the image forming apparatus executes. FIG. 7 schematically shows the second interrupt processing.

On the presumption, the MFP 10 has obtained execution instructions of two prior image forming jobs (the job 1 and the job 2), and has written the job 1 and the job 2 in the image-processing memory area 21 in this order from the front. Part of an image of the job 1 in front has been formed, or the job 1 is in the output queue. The job 2 is in the output queue. After that, the MFP 10 has obtained the interrupt execution instruction of the image forming job (interrupt job) (Step S101), and has suspended all the prior image forming jobs (the job 1 and the job 2) being executed by using the image-processing memory area 21 (Step S102).

The prior job save unit 103 defines the prior image forming job in front (in this example, the job 1) out of the prior image forming jobs written in the image-processing memory area 21. Note that it does not matter whether part of the job 1 has been executed or the job 1 is in the output queue. The prior job save unit 103 retrieves the defined prior image forming job in front (the job 1) from the image-processing memory area 21, writes the image data (if part of the job has been executed, image data yet to be output) of the job 1, which is written in the image-processing memory area 21, in the image-storage memory area 23 (Step S301), and writes the execution information (if part of the job has been executed, execution information to be applied to image data yet to be output) in the unique memory area 24 (Step S302). The "image data" written in the image-storage memory area 23 is so-called raw data, which is different from printable data written in the received-data-storage memory area 22 (Step S203) in the first interrupt processing. The prior job save unit 103 deletes the job 1 from the image-processing memory area 21 to free part of the image-processing memory area 21 (area in which the job 1 is written), and completes the job 1 (the job result is not remained in the image-processing memory area 21) (Step S303). The job 2, which is written next to the job 1 in the image-processing memory area 21, is in a standby status (Step S304).

The prior job save unit 103 determines if an available memory amount of the image-processing memory area 21, from which the job 1 has been deleted, is a memory amount with which the interrupt job can be executed (Step S305). Where determining that the interrupt job cannot be executed (Step S305, NO), the prior job save unit 103 executes the processing of Steps S301 to S303 of the prior image forming job next to the job 1. Where determining that the interrupt job can be executed (Step S305, YES), the prior job save unit 103 notifies the interrupt job execution unit 104 of that.

When the interrupt job execution unit 104 receives the notification from the prior job save unit 103, the interrupt job execution unit 104 writes the interrupt job in the image-processing memory area 21, part of which is freed (area in which the job 1 was written). The interrupt job execution unit 104 rewrites the priority order of the interrupt job and the job (the job 2) written in the image-processing memory area 21 (Step S306), and puts the highest priority on the interrupt job. The interrupt job execution unit 104 executes the interrupt job, which has the highest priority order (Step S307). Specifically, the interrupt job execution unit 104 generates printable data by applying the execution information to the image data of the interrupt job, and outputs the generated printable data. When the executed interrupt job is completed, the interrupt job execution unit 104 notifies the prior job execution unit 105 of that.

When the prior job execution unit 105 receives the notification from the interrupt job execution unit 104, the prior job execution unit 105 resumes the suspended prior image forming job (Step S102) being executed by using the image-processing memory area 21. In other words, firstly, the prior job execution unit 105 resumes the job 1 in front. Specifically, the prior job execution unit 105 writes the job 3 in the image-processing memory area 21 as a new job. The prior job execution unit 105 retrieves the execution information of the job 1 written in the unique memory area 24 (Step S302). The prior job execution unit 105 writes the execution information of the retrieved job 1 over the job 3 written in the image-processing memory area 21. As a result, the prior job execution unit 105 starts the job 3 as a job the same as the job 1. In other words, the prior job execution unit 105 recovers the job 1 (Step S308). The prior job execution unit 105 rewrites the priority order of the job 3 (same as the job 1) and the job (the job 2) written in the image-processing memory area 21 (Step S309), and puts the highest priority on the job 3 (same as the job 1). Next, the prior job execution unit 105 retrieves the image data of the job 1 written in the image-storage memory area 23 (Step S301), generates printable data by applying the execution information to the retrieved image data of the job 1, and forms (prints) the image of the generated printable data (Step S310). The prior job execution unit 105 determines if another standby job is written in the image-processing memory area 21 or not (Step S311). At last, the prior job execution unit 105 executes all the standby jobs written in the image-processing memory area 21 (Step S311, NO).

(4. Conclusion)

A low-spec MFP, which has no high-capacity storage device such as an HDD (Hard Disk Drive), can only use a memory area for image processing (image processing area) to execute image forming jobs. Such a low-spec MFP secures a memory of a minimum capacity necessary to execute a single job and executes the job to reliably execute multiple jobs. Because of this, the number of executable jobs, without being placed in a queue, is limited depending on the memory amount of the image processing area. Therefore, when such a low-spec MFP obtains an execution instruction of an interrupt image forming job during execution of a prior image forming job, such a low-spec MFP cannot immediately execute the interrupt image forming job if the memory amount of the image processing area is not enough. Such a low-spec MFP can execute the interrupt image forming job only after the memory amount of the image processing area reaches a memory amount with which the interrupt image forming job can be executed. However, it is desirable for an MFP to, when the MFP obtains an interrupt execution instruction of an image forming job, reliably execute the interrupt image forming job in interrupt processing. A reason is as follows. A user, who inputs the interrupt execution instruction in the MFP, wishes to execute the interrupt image forming job even if the prior image forming job is to be suspended and executed later.

In view of the above-mentioned circumstances, according to the present embodiment, the job execution circuit 100 of the MFP 10 selects one of the first interrupt processing and the second interrupt processing to be executed based on the available memory amount of the image-storage memory area 23 and the available memory amount of the unique memory area 24. In the first interrupt processing, the job execution circuit 100 generates printable data by applying the execution information to image data of the suspended prior image forming job, writes the generated printable data in the received-data-storage memory area 22, deletes the prior image forming job from the image-processing memory area 21 to free the image-processing memory area 21, executes an interrupt image forming job of the interrupt execution instruction by using the image-processing memory area 21, the prior image forming job having been deleted from the image-processing memory area 21, and retrieves the printable data written in the received-data-storage memory area 22 and forms an image by using the retrieved printable data to execute the suspended prior image forming job. In the second interrupt processing, the job execution circuit 100 writes image data of the suspended prior image forming job in the image-storage memory area 23, writes execution information of the prior image forming job in the unique memory area 24, deletes the prior image forming job from the image-processing memory area 21 to free the image-processing memory area 21, executes the interrupt image forming job by using the image-processing memory area 21, the prior image forming job having been deleted from the image-processing memory area 21, writes the prior image forming job of the execution information written in the unique memory area 24, in the image-processing memory area 21, and retrieves the image data written in the image-storage memory area 23 and executes the prior image forming job written in the image-processing memory area 21 to execute the suspended prior image forming job.

In other words, according to the present embodiment, where the available memory amount of the image-processing memory area 21 is not enough because the job execution circuit 100 of the MFP 10 is executing a prior image forming job, the job execution circuit 100 of the MFP 10 writes the image data of the prior image forming job in the image-storage memory area 23, and writes the execution information in the unique memory area 24. Therefore, even in such a case, it is possible to save the prior image forming job from the image-processing memory area 21, and to free part of the image-processing memory area 21 (second interrupt processing). Meanwhile, where the available memory amount of the image-storage memory area 23 and the available memory amount of the unique memory area 24 are not enough, the job execution circuit 100 of the MFP 10 generates printable data by applying the execution information to the image data of the prior image forming job, and writes the generated printable data in the received-data-storage memory area 22. Therefore, even in such a case, it is possible to save the prior image forming job from the image-processing memory area 21, and to free part of the image-processing memory area 21 (first interrupt processing). According to the first interrupt processing, since printable data of a prior image forming job is generated and the printable data is saved from the image-processing memory area 21, it is not necessary to generate printable data of the prior image forming job when resuming the prior image forming job, and it is possible to immediately resume the prior image forming job. Meanwhile, according to the second interrupt processing, since a prior image forming job is saved from the image-processing memory area 21 without generating printable data of the prior image forming job, it is not necessary to generate printable data before saving, and it is possible to immediately execute an interrupt image forming job.

As a result, the MFP is highly reliable in, when obtaining an interrupt execution instruction of an image forming job, executing the interrupt image forming job before a prior image forming job (in interrupt processing). Further, since the MFP 10 locally includes the received-data-storage memory area 22, the image-storage memory area 23, and the unique memory area 24, it is possible to save a prior image forming job from the image-processing memory area 21 without preparing an information processing apparatus as a server apparatus.

Note that, where there is an interrupt image forming job prior to an interrupt image forming job, the job execution circuit 100 executes the prior interrupt image forming job in advance.

It should be understood by those skilled in the art that various modifications, combinations, sub-combinations and alterations may occur depending on design requirements and other factors insofar as they are within the scope of the appended claims or the equivalents thereof.

What is claimed is:

1. An image forming apparatus, comprising:
a first memory area used for image processing;
a second memory area different from the first memory area;
a third memory area used to store the image data;
a fourth memory area being a unique memory area used to store the execution information; and
a job execution circuit that
  obtains an interrupt execution instruction of an image forming job, the interrupt execution instruction including image data and execution information, the execution information being to be applied when forming an image of the image data,
  suspends a prior image forming job being executed by using the first memory area, and
as a first interrupt processing,
  generates printable data by applying the execution information to image data of the suspended prior image forming job,
  writes the generated printable data in the second memory area,
  deletes the prior image forming job from the first memory area to free the first memory area,
  executes an interrupt image forming job of the interrupt execution instruction by using the first memory area, the prior image forming job having been deleted from the first memory area, and
  retrieves the printable data written in the second memory area and forms an image by using the retrieved printable data to execute the suspended prior image forming job,
wherein when the job execution circuit obtains the interrupt execution instruction, the job execution circuit further
  determines if an available memory amount of the third memory area is a memory amount, with which the image data of the prior image forming job in front can be written, or not,
  determines if an available memory amount of the fourth memory area is a memory amount, with which the execution information of the prior image forming job in front can be written, or not, and
  where determining that the image data cannot be written in the third memory area and/or the execution information cannot be written in the fourth memory area, executes the first interrupt processing,
wherein where determining that the image data can be written in the third memory area and the execution information can be written in the fourth memory area, the job execution circuit, as a second interrupt processing,
  writes image data of the suspended prior image forming job in the third memory area,
  writes execution information of the prior image forming job in the fourth memory area,
  deletes the prior image forming job from the first memory area to free the first memory area,
  executes the interrupt image forming job by using the first memory area, the prior image forming job having been deleted from the first memory area,
  writes the prior image forming job of the execution information written in the fourth memory area, in the first memory area, and
  retrieves the image data written in the third memory area and executes the prior image forming job written in the first memory area to execute the suspended prior image forming job.

2. The image forming apparatus according to claim 1, wherein
when the job execution circuit frees the first memory area in the first interrupt processing, the job execution circuit
  generates printable data of the suspended prior image forming job in front, and writes the generated printable data in the second memory area,
  deletes the prior image forming job in front from the first memory area to free the first memory area,
  determines if an available memory amount of the first memory area, the prior image forming job in front having been deleted from the first memory area, is a memory amount with which the interrupt image forming job can be executed,
  where determining that the interrupt image forming job can be executed, executes the interrupt image forming job by using the first memory area, and
  where determining that the interrupt image forming job cannot be executed, generates printable data of another prior image forming job, writes the generated printable data in the second memory area, and deletes the other prior image forming job from the first memory area.

3. The image forming apparatus according to claim 2, wherein
when the job execution circuit generates printable data in the first interrupt processing, the job execution circuit generates printable data of a prior image forming job, image forming processing of the prior image forming job being yet to be started, out of the suspended prior image forming job.

4. The image forming apparatus according to claim 2, wherein
the second memory area is a memory area used to temporarily store data received by the image forming apparatus.

5. The image forming apparatus according to claim 2, wherein
when the job execution circuit generates printable data in the first interrupt processing, the job execution circuit generates a file of image data, and
generates printable data by applying the execution information to the file-of-image.

6. The image forming apparatus according to claim 1, wherein
when the job execution circuit frees the first memory area in the second interrupt processing, the job execution circuit
  writes image data of a prior image forming job in front in the third memory area, out of the suspended prior image forming job,
  writes execution information of the prior image forming job in front in the fourth memory area,
  deletes the prior image forming job in front from the first memory area to free the first memory area,
  determines if an available memory amount of the first memory area, the prior image forming job in front having been deleted from the first memory area, is a memory amount with which the interrupt image forming job can be executed, where determining that the interrupt image forming job can be executed, executes the interrupt image forming job by using the first memory area, and where determining that the interrupt image forming job cannot be executed, writes image data of another prior image forming job in the third memory area, writes execution information of the other prior image forming job in the fourth memory area, and deletes the other prior image forming job from the first memory area.

7. A non-transitory computer readable recording medium that stores a program executable by a computer of an image forming apparatus, the image forming apparatus including a first memory area used for image processing, a second memory area different from the first memory area, a third memory area used to store the image data; and a fourth memory area being a unique memory area used to store the execution information, the program causing the computer to:

obtain an interrupt execution instruction of an image forming job, the interrupt execution instruction including image data and execution information, the execution information being to be applied when forming an image of the image data;

suspend a prior image forming job being executed by using the first memory area; and as a first interrupt processing, generate printable data by applying the execution information to image data of the suspended prior image forming job, write the generated printable data in the second memory area, delete the prior image forming job from the first memory area to free the first memory area, execute an interrupt image forming job of the interrupt execution instruction by using the first memory area, the prior image forming job having been deleted from the first memory area, and retrieve the printable data written in the second memory area and form an image by using the retrieved printable data to execute the suspended prior image forming job, wherein when the interrupt execution instruction is obtained, the program further causes the computer to
determine if an available memory amount of the third memory area is a memory amount, with which the image data of the prior image forming job in front can be written, or not, determine if an available memory amount of the fourth memory area is a memory amount, with which the execution information of the prior image forming job in front can be written, or not, and where determining that the image data cannot be written in the third memory area and/or the execution information cannot be written in the fourth memory area, execute the first interrupt processing, wherein where determining that the image data can be written in the third memory area and the execution information can be written in the fourth memory area, the job execution circuit, as a second interrupt processing, write image data of the suspended prior image forming job in the third memory area, write execution information of the prior image forming job in the fourth memory area, delete the prior image forming job from the first memory area to free the first memory area, execute the interrupt image forming job by using the first memory area, the prior image forming job having been deleted from the first memory area, write the prior image forming job of the execution information written in the fourth memory area, in the first memory area, and retrieve the image data written in the third memory area and executes the prior image forming job written in the first memory area to execute the suspended prior image forming job.

8. An information processing method, comprising:

by an image forming apparatus, the image forming apparatus including a first memory area used for image processing, a second memory area different from the first memory area, a third memory area used to store the image data, and a fourth memory area being a unique memory area used to store the execution information;

obtaining an interrupt execution instruction of an image forming job, the interrupt execution instruction including image data and execution information, the execution information being to be applied when forming an image of the image data;

suspending a prior image forming job being executed by using the first memory area; and as a first interrupt processing, generating printable data by applying the execution information to image data of the suspended prior image forming job, writing the generated printable data in the second memory area, deleting the prior image forming job from the first memory area to free the first memory area, executing an interrupt image forming job of the interrupt execution instruction by using the first memory area, the prior image forming job having been deleted from the first memory area, and retrieving the printable data written in the second memory area and forming an image by using the retrieved printable data to execute the suspended prior image forming job wherein when obtaining the interrupt execution instruction determining if an available memory amount of the third memory area is a memory amount, with which the image data of the prior image forming job in front can be written, or not, determining if an available memory amount of the fourth memory area is a memory amount, with which the execution information of the prior image forming job in front can be written, or not, and where determining that the image data cannot be written in the third memory area and/or the execution information cannot be written in the fourth memory area, executing the first interrupt processing, wherein where determining that the image data can be written in the third memory area and the execution information can be written in the fourth memory area, executing, as a second interrupt processing, writing image data of the suspended prior image forming job in the third memory area, writing execution information of the prior image forming job in the fourth memory area, deleting the prior image forming job from the first memory area to free the first memory area, executing the interrupt image forming job by using the first memory area, the prior image forming job having been deleted from the first memory area, writing the prior image forming job of the execution information written in the fourth memory area, in the first memory area, and retrieving the image data written in the third memory area and executes the prior image forming job written in the first memory area to execute the suspended prior image forming job.

\* \* \* \* \*